(No Model.)
W. G. RICKER.
HAY SLING.
No. 392,690. Patented Nov. 13, 1888.
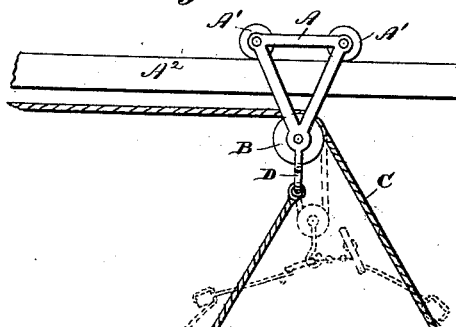
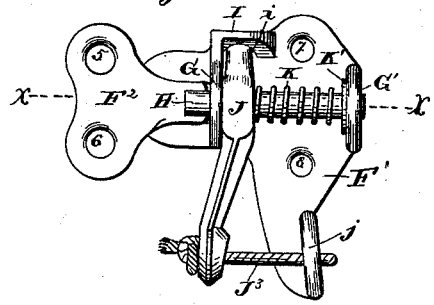
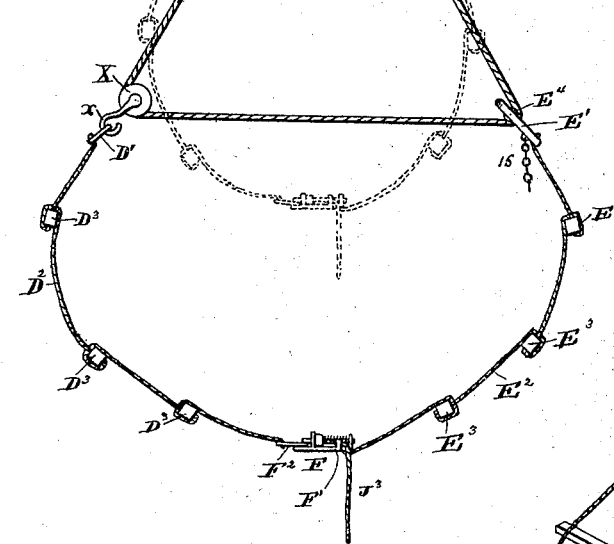
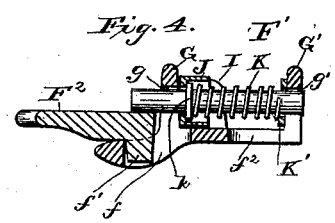
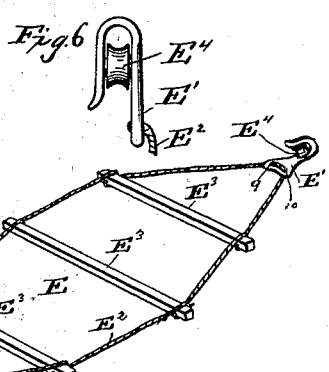
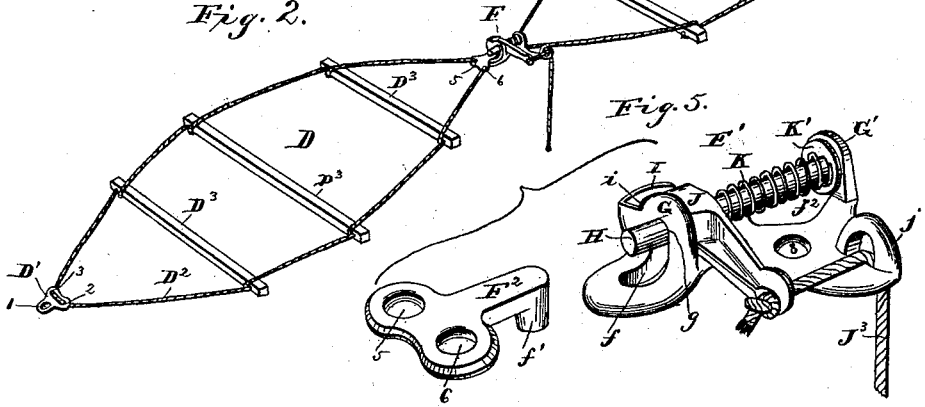
Witnesses.
Chas. R. Bull.
Thomas Durant.
Inventor.
Wentworth G. Ricker,
by Church & Church
his Attorneys.
N. PETERS, Photo-Lithographer, Washington, D. C.

UNITED STATES PATENT OFFICE.

WENTWORTH G. RICKER, OF ROCHESTER, NEW YORK.

HAY-SLING.

SPECIFICATION forming part of Letters Patent No. 392,690, dated November 13, 1888.

Application filed June 13, 1888. Serial No. 276,909. (No model.)

*To all whom it may concern:*

Be it known that I, WENTWORTH G. RICKER, of Rochester, in the county of Monroe and State of New York, have invented certain new and useful Improvements in Hay-Slings; and I do hereby declare the following to be a full, clear, and exact description of the same, reference being had to the accompanying drawings, forming a part of this specification, and to the figures and letters of reference marked thereon.

My present invention relates to improvements in hay-slings, whereby the binding of the hay into a compact bundle and the raising and transportation of it are accomplished in a more desirable manner and with less expenditure of power than formerly, and also to an improved construction of detachable coupling for the sling-sections enabling the load to be more readily dumped than heretofore, irrespective of the position of the operator relative to the sling; and to these ends the invention consists in certain novelties of construction and combinations of parts, all as will be hereinafter described, and pointed out particularly in the claims at the close of this specification.

In the drawings, Figure 1 is a view of the hay carrier and sling, showing the manner of using my invention; Fig. 2, a view of the sling detached; Fig. 3, a view of the coupling; Fig. 4, a sectional view through the coupling, on the line $x$ $x$ of Fig. 3; and Fig. 5, a view of the parts of the coupling detached. Fig. 6 is a detail.

Similar letters of reference in the several figures denote similar parts.

A represents a hay-carrier, of any suitable or approved construction, provided with the transporting-wheels A' A', arranged to travel upon a suitable track or support, $A^2$, with a pulley, B, over which the raising and transporting rope C passes, and below and supported upon the carriage is a hook or other fastening, D, to which the end of rope C is attached in any suitable manner.

The sling proper is constructed, as shown in Fig. 2, of two sections, D and E, detachably connected at the center by a detachable coupling, $f$, further on described. The section D is provided at one end with a plate or casting, D', having perforations 2 and 3 and a loop or perforation, 1, therein, the loop 1 for the engagement of the hook $x$ of the lifting-pulley X, mounted on the rope C, and the two perforations 2 and 3 for the passage of the rope $D^2$, composing the main portion of the section. This rope is passed through the corresponding perforations 5 and 6 on one of the coupling-sections, and the parts forming the sides are united by the slats $D^3$ in the ordinary manner.

The section E of the sling is composed of a rope, $E^2$, and slats $E^3$, the same as in section D, perforations 7 and 8 being provided in the part of the detachable coupling for the rope, while at the outer end is provided a plate or casting, E', having perforations 9 and 10 for the passage of the rope, and an open-sided recess is also formed on this casting, in which is a small roller, $E^t$, adapted to be placed over the rope C, as will be explained.

To the lower side of the casting E' is attached a link or a series of links constituting a chain, 15, adapted to be engaged by the hook $x$ on the pulley when the ends of the sling are to be secured together.

The construction of the detachable coupling F is clearly shown in Figs. 3, 4, and 5. One of the parts consists of the plate or casting F', having the perforations for the rope, (though this may be attached in any suitable manner,) and a perforation, $f$, with which latter the hook or projection $f'$ on the co-operating coupling-section $F^2$ engages.

G G' represent two projections having perforations $g$ $g'$ therein, in line with each other, which preferably communicate with recesses $f$ and $f^2$, respectively, in the base-plate, and in which the locking-bolt H is arranged to operate.

I is a lug formed upon the base and provided with a perforation, $i$, in which is inserted the end of a lever, J, a perforation being provided in the lever, through which a bolt, H, passes, while the outer end of the lever is perforated for the passage of a releasing-rope, $J^3$, said rope also passing through a guiding-aperture in the plate, or, preferably, through a perforated lug, $j$, formed thereon. The forward end of the bolt H, when projected, passes over the perforation $f$ in the plate, so as to hold the hook $f'$ therein and prevent its removal, and just in rear of the lever J it is provided with a lug or collar, $k$, between which and the lug G' is placed a spring, K, encircling the bolt, with a washer, K', between it and said lug.

The section F² of the coupling is provided with the perforations for the passage of rope D²; or, if desired, any other means of fastening can be employed, and with a hook or projection, f', over the top of which the bolt H can project to hold it in engagement with the perforation f in section F'.

The operation of the coupling will now be understood. The hook f' is inserted in the recess f, and the spring holds the bolt projected over it, holding it in position and preventing its disengagement, and, when desired to uncouple the sections, a pull upon the rope J³ will retract the bolt and permit the hook f' to disengage itself, as will be seen. By reason of the guiding-loop j it is immaterial from which direction the pull to release the bolt is given, so that the operator, whether standing above or below the sling, can release it. The sling is intended to be placed in the hay-wagon between every three or four hundred pounds of hay, and the two sections F' F² of the coupling are adapted to be secured to the wagon-standards in the usual manner. When it is desired to remove these charges to transport them into a barn or hay-mow, the pulley X on the rope C is moved down and its hook x engaged with perforation or loop 1 on plate D', the loop of the rope between pulleys B and X being slipped in the open-sided recess beneath roller E⁴. The rope C is then drawn upon by the horse attached to it, (or any other motor may be employed,) which draws over pulley B and causes the approach of plates D' and E', and when these are close together the operator hooks a link or loop of the chain 15 on the latter (or an equivalent fastening) over hook x on the pulley and slips the rope from beneath roller E⁴, transferring all the weight to the block X. Now the continued draft upon the rope raises the sling and moves the carrier and sling full of hay along until the desired position is reached, when, by a pull upon the lever-rope J³, the operator causes the disconnection of the coupling, the separation of the sections, and the dropping of the hay, leaving the two sling-sections suspended from the hook. These are taken off the carrier, returned to first position, and another sling transferred in a similar manner.

Any desired device for holding the carriage stationary during the raising and for transferring the loaded pulley X to said carriage when raised may be employed, if desired, or these may be dispensed with.

Of course, instead of being employed on a wagon, as described, the sling can be used in any manner desired and other material than hay manipulated.

By the employment of the open-sided recess, in which the roller is preferably mounted and the loop or link for connecting the ends of the sling, I am enabled to dispense with one of the two pulleys heretofore employed and draw the ends of the sling together, then transfer the sling to the movable pulley and allow the latter to be raised straight upward, so that if a carrier is employed with which the loose pulley is adapted to engage and upon which it is to be supported the registering of the parts will be insured.

The manner of forming the coupling is also advantageous, (aside from the advantage resulting from the use of the guiding-loop for the bolt-releasing rope,) in that it can be very cheaply made and put together, being composed of but five pieces—the base-casting, lever, spring, bolt, and co-operating hook-section—and requiring no fitting in putting the parts together. The manner of taking it to pieces is very simple, the bolt being moved back until released from the lug G. Then its end and the lever J are raised above said lug and the bolt and lever removed, a reversal of the operation being only necessary to put them in place again. The bolt, it will be noted, is limited in its forward movement by the lever, which strikes against lug G, and the end of the lever is held from withdrawal from the lug I by the bolt. A very simple coupling is thus secured, which may be used for other purposes than that described herein.

The arrangement of the whole sling is very simple, cheaply made, easily put together, and not very likely to get out of order.

It is obvious that instead of connecting the hook end of the sling to the hook on the pulley X, when the sling is to be raised, it could as well be connected to the plate D' by a hook or other suitable connection.

I claim as my invention—

1. The combination, with the carrier, the suspending-rope, and the loose pulley thereon, of the sling having the loop at one end, and at the other a casting carrying a roller mounted in an open-sided recess, and a link or loop adapted to be connected to the pulley on the rope, substantially as described.

2. The combination, with the carrier, the suspending-rope, and the pulley thereon, of the sling having the loop at one end, and at the other a casting having an open-sided recess, and a link or loop adapted to be connected to the pulley on the rope, substantially as described.

3. In a hay-sling, the combination, with the loop at one end, of the casting at the other having the open-sided recess, and the connecting link or loop, substantially as described.

4. A hay-sling constructed in two parts, with a detachable coupling between them, one of the sling ends having a loop thereon, and the other provided with a casting having an open-sided recess and a connecting link or loop, substantially as described.

5. The combination, with a hay-sling constructed in two parts, of a detachable coupling for connecting them, embodying a movable bolt, a rope for operating it, and a guide-loop on one section of the coupling, so located relatively to the direction of movement of the bolt that a pull on the rope will retract the bolt and disengage the sections of the coupling, substantially as described.

6. In a coupling of the character described, the combination, with one section embodying the base-casting having the perforations for guiding the bolt and the recess over which the bolt is adapted to project, the perforated lever having the extended end, the bolt passing through it, the recess into which the lever end projects, and the spring operating on the bolt, of the co-operating section having the hook or projection entering the recess on the other section, substantially as described.

7. In a coupling of the character described, the combination, with the one section having the base-casting, having the perforations for guiding the bolt, and the perforated lever having the projecting portion engaging the casting loosely, the bolt passing through the lever and engaging therewith, and the spring for operating said bolt, of the co-operating coupling-section adapted to be held by the bolt when projected by the spring, substantially as described.

8. In a coupling of the character described, the combination, with the one section embodying the base-casting, having the perforations for guiding the bolt, the perforated lever having the projecting portion engaging the casting loosely, the bolt passing through the lever and engaging therewith, the spring for operating said bolt, a loop or eye on the casting, and a cord attached to the lever for operating the same passing through said loop, of a co-operating coupling-section held in engagement by the bolt when projected by the spring, substantially as described.

9. In a coupling of the character described, the combination, with the one section embodying the base-casting, having the recess therein for the engagement of the co-operating section and the bolt projecting over said recess, of the co-operating coupling-section having the hook or lug thereon adapted to engage with the recess in the other section, substantially as described.

WENTWORTH G. RICKER.

Witnesses:
 FRED F. CHURCH,
 F. B. HUTCHINSON.